United States Patent [19]

Clark

[11] Patent Number: 5,311,371
[45] Date of Patent: May 10, 1994

[54] MAGNETIC TAPE DATA RECOVERY METHOD

[76] Inventor: Harold W. Clark, 1751 Stebbins Dr., Houston, Tex. 77043

[21] Appl. No.: 279

[22] Filed: Jan. 4, 1993

[51] Int. Cl.$^5$ .............................................. G11B 5/86
[52] U.S. Cl. ....................................... 360/16; 360/15; 360/137
[58] Field of Search .............. 360/134, 137, 90, 97.02, 360/16, 15, 17; 369/84–85

[56] References Cited

U.S. PATENT DOCUMENTS 4,523,133  6/1985  Messenger ............................ 360/71

FOREIGN PATENT DOCUMENTS 4013220  1/1992  Japan .................................... 360/16

Primary Examiner—Andrew L. Sniezek
Assistant Examiner—Jennifer Pearson
Attorney, Agent, or Firm—Bush, Moseley & Riddle

[57] ABSTRACT

In accordance with an illustrative embodiment of the present invention, a magnetic tape which has seismic data thereon and which has been stored for so long that stiction is a problem is temporarily placed in an environmentally sealed room and subjected to a temperature of about 140° F. and a relative humidity of 20% or less for about 48 hours. After removal from the room and cooling down to ambient temperature of about 70° F. in the presence of relative humidity of about 50%, the tape is cleaned and retensioned on a reel. The data then can be read out onto another media with recovery of practically 100% of the seismic data.

7 Claims, 1 Drawing Sheet

MAGNETIC TAPE DATA RECOVERY METHOD

FIELD OF THE INVENTION

This invention relates generally to the recovery of data from aged magnetic tapes, and particularly to new and improved methods and systems for recovering data, such as seismic data, from magnetic tapes that have been in storage so long as to develop stiction problems.

BACKGROUND OF THE INVENTION

When a standard magnetic tape of the type used to record seismic exploration or other data has aged about ten (10) years or more, the binder or coating ingredients begin to break down due to exposure to heat and humidity. The coating softens and forms a sticky debris which collects on and contaminates the read/write head and other components of a tape drive machine, and the tape can actually stick to a component ("stiction"). The severity of such stiction depends on the age of the tape and the length of time it was exposed to uncontrolled environments. When copying data from such tape onto a new one, the old tape may experience stiction to the point that a complete read pass is almost impossible, resulting in much wasted time. In severe situations, the tape surface is damaged and seismic data is permanently lost. In any event the tape runs dirty and generates additional debris which causes increased play-back errors.

Various methods have been tried to alleviate the stiction problem, but without any particularly impressive results. One method employs the application of a cleaner, together with special drives and other hardware. However the treated tape must be used quickly, or else it must be treated again. Of course special drive hardware is expensive, and economically justified only when a very larger archive of magnetic tapes requires copying. Another process slows down the input tape speed to a low value, for example 25 inches/sec., with a constant read of the data into a cache and constant write to an output media. However this process is slow, and the data can be lost through read and/or write failures. Yet another process which has been tried is to heat and then super-cool the tape on its drive, while moving at a very short IPS. Still another effort has been to flash freeze the tape. However it is not believed that any of these methods has been met with any degree of commercial success.

A general object of the present invention is to provide new and improved methods and systems for copying data from previously damaged magnetic tape.

Another object of the present invention is to provide new and improved methods and systems of the type described which enables a smooth running, full length copy to be made without sticking and resultant lost time.

Another object of the present invention is to provide new and improved methods and systems of the type described which produce a clean copy with no debris errors.

Still another object of the present invention is to provide new and improved methods and systems of the type described which permits a smooth, clean copy pass so that all available data on the magnetic tape can be properly read.

SUMMARY OF THE INVENTION

These and other objects are attained in accordance with the concepts of the present invention through the provision of a data recovery process comprising the steps of placing a tape subject to stiction in a clean, closed room, raising the temperature therein to a value that is in the range of from about 132°–140° F., reducing the humidity in such room to about 20% or lower, and then leaving an aged magnetic tape stored in such room under such conditions of temperature and humidity for about 48 hours. The tape then is moved to an outside room where it is allowed to cool down to an ambient temperature of about 70° F. and a humidity of about 50%. Next the tape is cleaned and wiped to remove debris and other minute particles, and then mounted on a drive which preferably has a read head with a hard metal surface such as chrome. Finally the seismic or other data is read out onto a new tape or media where practically 100% of the data is recovered.

BRIEF DESCRIPTION OF THE DRAWINGS

The present invention has other objects, features and advantages which will become more clearly apparent in connection with the following detailed description of a preferred embodiment, taken in conjunction with the appended drawings in which.

DETAILED DESCRIPTION OF A PREFERRED EMBODIMENT

Figure 1:
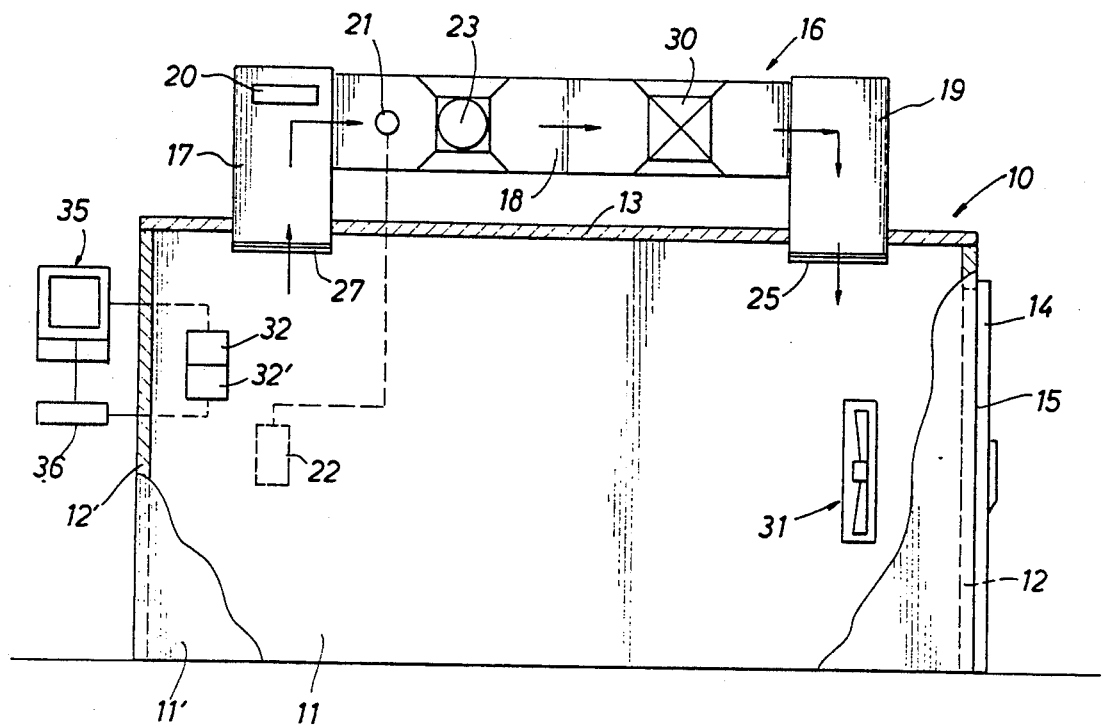
FIG. 1 is a schematic side view illustrating a tape processing facility in accordance with the present invention.

Referring to the drawing figure, a clean room indicated generally at 10 preferably is a box-like structure having side walls 11 and 11', front and rear end walls 12, 12' and a top wall or ceiling 13. The front wall 12 is provided with an opening which is adapted to be closed off by a hinged door 14 which has gaskets or seals 15, much like the seals on a refrigerator door, which seal against the borders of the opening when the door is closed. The lower edges of each of the side walls 11, 11' and the end walls 12, 12' also are provided with gasket seals to provide an absolute clean and isolated environment inside the room 10. One example of preferred overall dimensions for the room 10 are 8 ft. wide, 8 ft. high, and 12 ft. long, although other dimensions could be used.

Mounted to the top wall 13 is a duct system indicated generally at 16 which has various components which condition the air in the room 10. The system 16 includes a return air duct 17, a longitudinal duct 18, and an air supply duct 19. The return duct 17 is provided with an adjustable vent 20 for humidity control. A temperature probe or thermostat 21 within the inlet end portion of the duct 18 is connected to a control 22 that can be mounted on the outside of the wall 11. A centrifugal blower assembly 23 is mounted near the center of the duct 18 and causes air to be continuously circulated out of the supply vent 25, through the interior of the room 10, and to where it returns through the vent 27. A suitable heater 30 is mounted in the duct 18 to provide a controllable heat source. A circulating fan 31 can be mounted near the door 14 to assist air circulation.

The respective outputs of a temperature sensor 32 and a relative humidity sensor 32' mounted on an inside wall of the room 10 are fed to a computer 35 which monitors their respective values. A computer terminal 36 is used to provide commands to the computer 35 so that the temperature and humidity of the air inside the room 10 can be maintained within certain ranges as will be described below.

OPERATION

Figure 2:
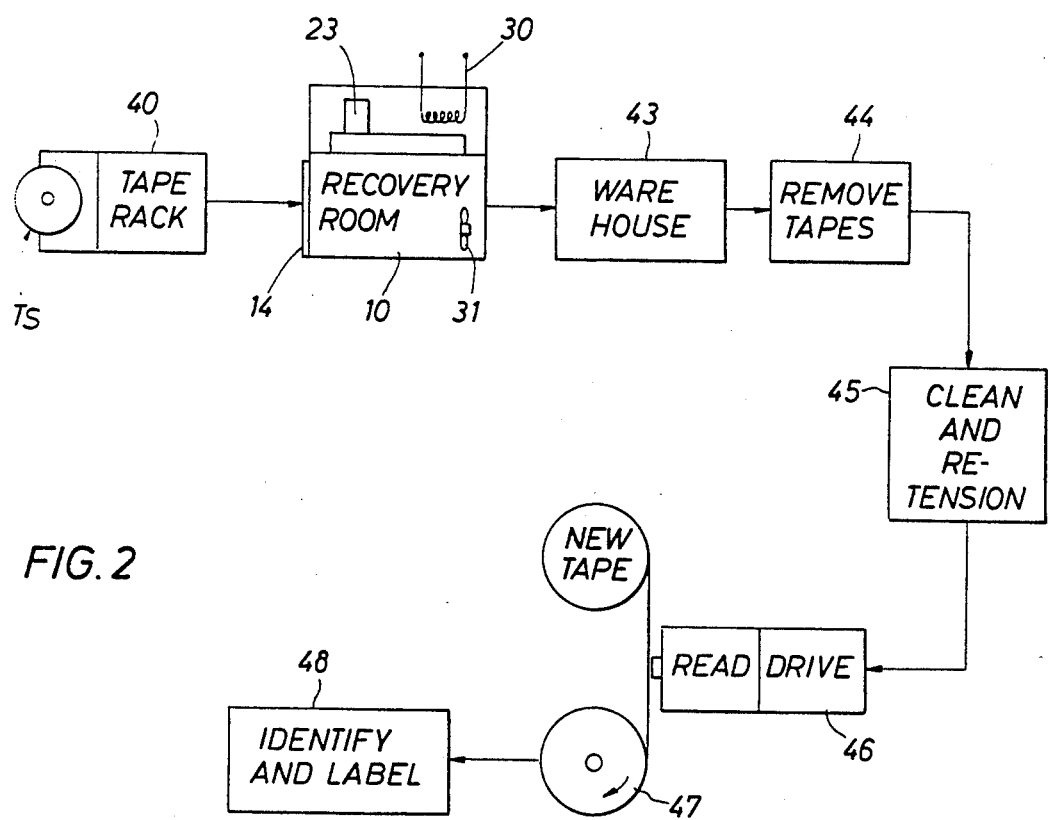
FIG. 2 is a work flow diagram showing generally how the magnetic tapes are handled during processing.

In operation, when one or more aged magnetic tapes Ts having stiction problems are identified, they are removed from the canister, and the tapes and their reels are placed in roll-in slots on tape rack 40 as shown in FIG. 2. The racks 40 then are moved inside the room 10 and the door 14 is closed to create a positively sealed environment. The temperature inside the room 10 is brought up by the heater 30 a predetermined level in the range of from about 132°-140° F., and the relative humidity in the room is reduced to a range of about 3-20%. These parameters are maintained at these values for at least about 48 hours.

As noted above, stiction is what occurs when a tape binder or coating has degraded due to age and to exposure to high temperatures and humid conditions for an extended period. Moisture from humid air penetrates the tape media and remains when the tape is stored in a humid environment. When storage temperature exceeds about 80° F. for extended periods, the moisture attacks the polyester urethane that typically has been used, and produces soft, sticky by-products. Such products can be readily abraded from the coating surface by modern ceramic head materials which are much rougher than head materials that were used on older magnetic tape drives. The products tend to cling to the read head, and often are redeposited back onto the coating surface during processing. This results in a permanent read-error condition, and loss of seismic data permanently.

Then the door 14 of the room 10 is opened and the rack and reels are moved to a warehouse area 43 where the ambient temperature is maintained at about 70° F., and relative humidity at about 50%. The reels and tapes are allowed to cool down to such ambient temperature before any further processing is done. During such heating and cool down process step, the tape is rejuvenated by removal of the excess moisture. The tapes then are removed from their reels at 44, and preferably are cleaned and retensioned on a typical mechanical tape cleaner assembly 45. The tapes which had stiction problems are mounted on drives 46 which preferably have hard head surfaces made of a metal such as chrome to minimize any further abrasion of tapes. It has been found that the tapes can be copied at full speed under low tension and copied onto new output media 47 as is done with tapes which do not have such problems. The new tapes are identified and labeled at 48 to complete the process in accordance with the present invention.

It now will be recognized that new and improved methods and systems have been provided for recovering data, particularly seismic data, from damaged magnetic tapes having stiction problems developed during long periods of storage. The methods have been found to be reliable and safe. Since certain changes or modifications may be made in the disclosed embodiment without departing from the inventive concepts involved, it is the aim of the appended claims to cover all such changes and modifications falling within the true spirit and scope of the present invention.

What is claimed is:

1. A method of processing a magnetic tape having stiction to enable the recovery of data thereon, comprising the steps of: placing said tape in a controlled environment under a selected range of elevated temperatures and reduced relative humidity for a selected time period; removing said tape from said environment and allowing it to cool down in the presence of ambient temperature and relative humidity; and then copying the data on said tape onto new media.

2. The method of claim 1 wherein elevated temperatures are in the range of about 132°-140° F.

3. The method of claim 1 wherein said reduced relative humidity is in the range of about 10-20%.

4. The method of claim 1 wherein said selected time period is at least about 48 hours.

5. The method of claim 1 wherein said ambient temperature is about 70° F.

6. The method of claim 1 wherein said ambient relative humidity is about 50%.

7. The method of claim 1 including the further step of cleaning and retensioning said tape.

* * * * *